Patented Oct. 15, 1935

2,017,558

UNITED STATES PATENT OFFICE 2,017,558

PROCESS OF PREPARING CALCIUM CARBIDE

Ernst Winter, Cologne-Braunsfeld, and Fridolin Hartmann, Knapsack, near Cologne, Germany, assignors to Aktiengesellschaft für Stickstoffdünger, Knapsack, Bezirk Cologne-on-the-Rhine, Germany No Drawing. Application November 9, 1931, Serial No. 574,030. In Germany January 17, 1930

5 Claims. (Cl. 23—208)

The present invention relates to a modification of the process of preparing calcium carbide according to the so-called "dry gasification process."

The dry gasification process which is, for instance, described in our co-pending application Serial No. 338,433, filed on February 8, 1929 (now U. S. Patent 1,916,592 dated July 4, 1933) and its divisional application Serial No. 484,112, filed on September 24, 1930, (now U. S. Patent 1,947,120 dated February 13, 1934) consists, for instance, in using, in the process of preparing acetylene from calcium carbide, so much water in a finely divided form that there is present in addition to the amount theoretically required for converting the calcium carbide into calcium hydroxide, such a further quantity of water as is sufficient to absorb the heat evolved during the reaction, so that the temperature in the generator remains below 100° C. By this process a substantially dry calcium hydroxide powder is obtained.

Up to the present time this calcium hydroxide powder, as well as the calcium oxide powder obtained therefrom by calcination could not be used again in the carbide, furnace to form calcium carbide inasmuch as this powder because of its dust-like form is blown away by the gases in the carbide furnace, whereby the uniform distribution of the two reaction components, calcium oxide and carbon, is disturbed, this involving the disadvantage of an irregular melting and other drawbacks.

Now we have found that this substantially dry calcium hydroxide powder, obtained according to the "dry gasification process" and the calcium oxide powder obtained therefrom when formed into shaped bodies by the mere application of pressure and without using a binding agent, constitute excellent starting materials for preparing calcium carbide in the carbide furnace. This invention involves the advantage that the waste products from the "dry gasification process", which could hitherto not be used in practice in the carbide furnace to form calcium carbide, can be utilized again in the process of preparing calcium carbide and acetylene therefrom, by the application of a simple pressing operation.

One feature of our invention consists in this pressing operation. We have found that this substantially dry and dust-like calcium hydroxide powder and the calcium oxide powder obtained therefrom, as well as mixtures of both, can be formed into moulded articles which are as hard as stone, without using a binding agent. It is a surprising fact that to obtain these shaped bodies the application of a pressure of about 700 to 1200 kg/cm$^2$ is sufficient, whereas when using ordinary calcium oxide powder, such as is obtained from burnt limestone, the application of an extremely high pressure or the use of a binding agent is necessary.

Another feature of our invention resides in our discovery that these pressed bodies particularly, the bodies consisting of calcium oxide, represent an excellent starting material to be used in the carbide furnace. This calcium hydroxide or -oxide material is especially capable of reacting with carbon to form calcium carbide. Furthermore, due to the uniform size of these shaped bodies a uniform distribution of the reaction components and a more complete transformation into calcium carbide than could hitherto be obtained, takes place. The burnt limestone which was hitherto used in the preparation of calcium carbide contains pieces of various granular size besides a certain amount of powder, thereby causing an irregular composition of the reaction mixture, an irregular melting and an incomplete transformation into calcium carbide.

The calcined pressed bodies made from dust-like, practically dry calcium hydroxide powder which is obtained in the so-called dry gasification process have a lower specific weight than ordinary quicklime. For this reason they possess a greater electrical resistance so that the carbide furnace can now be operated at a higher current potential, though the same current intensity is applied. Consequently the output of the furnace is increased, that is, more calcium carbide than in former times can be prepared per unit of furnace.

Obviously, as regards the desired result, it is immaterial whether the calcium hydroxide powder is calcined prior to pressing it or afterwards. The calcining operation can also be dispensed with although it is preferable to use calcium oxide in the carbide furnace.

The following examples serve to illustrate the invention, but they are not intended to limit it thereto, the parts being by weight:

(1) 1 ton of anhydrous calcium hydroxide powder obtained as waste product from the dry gasification process is calcined at a temperature of between 500° C.–1000° C. and the 750 kilos of pulverized calcium oxide thus obtained are pressed, by means of an extrusion press or a hydraulic press under a pressure of between 700–1000 kilos per square centimeter and at a temperature of between 20° C. to 400° C. The shaped bodies produced possess the mechanical strength of calcined lump lime. These shaped bodies are smelted and burned with carbon in a carbide furnace. An almost complete formation of calcium carbide takes place.

(2) 1 ton of anhydrous calcium hydroxide powder obtained as a by-product in the dry gasification of calcined carbide is pressed without a previous calcination, while applying a pressure of 700–1200 kilos per square centimeter. The briquettes obtained are calcined in the shaft furnace. 750 kilos of calcium oxide briquettes are obtained, which can be used in the carbide furnace as described in Example 1.

This application contains subject matter in common with our application Serial No. 509,539 filed on January 17, 1931.

We claim:

1. The process which comprises calcining dustlike, practically dry calcium hydroxide powder, as is obtained according to the dry gasification process, pressing the calcium oxide powder thus obtained alone into strongly coherent shaped bodies by the application of pressure and thereupon subjecting, in the presence of carbon, the shaped bodies thus obtained to a smelting and burning process to form calcium carbide.

2. The process which comprises pressing dustlike, practically dry calcium hydroxide powder, as is obtained according to the dry gasification process, alone into strongly coherent shaped bodies by the application of pressure, calcining these shaped bodies and subjecting, in the presence of carbon, the shaped bodies thus obtained to a smelting and burning process to form calcium carbide.

3. The process which comprises calcining dustlike, practically dry calcium hydroxide powder, as is obtained according to the dry gasification process, pressing the calcium oxide powder thus obtained alone into strongly coherent shaped bodies by the application of a pressure of about 700 to 1200 kilos per square centimeter, and thereupon subjecting, in the presence of carbon, the shaped bodies thus obtained to a smelting and burning process to form calcium carbide.

4. The process which comprises pressing dustlike, practically dry calcium hydroxide powder, as is obtained according to the dry gasification process, alone into strongly coherent shaped bodies by the application of a pressure of about 700 to 1200 kilos per square centimeter, calcining these shaped bodies and subjecting, in the presence of carbon, the shaped bodies thus obtained to a smelting and burning process to form calcium carbide.

5. The process which comprises converting dustlike, practically dry calcium hydroxide powder, as is obtained according to the dry gasification process, alone into strongly coherent shaped bodies consisting of calcium oxide by the steps of pressing and calcination, and thereupon subjecting, in the presence of carbon, the shaped bodies thus obtained to a smelting and burning process to form calcium carbide.

ERNST WINTER.
FRIDOLIN HARTMANN.